United States Patent [19]

Sika et al.

[11] 3,940,643
[45] Feb. 24, 1976

[54] CRYOGEN-COOLED SYNCHRONOUS COMPENSATOR

[76] Inventors: Zigurd Karlovich Sika, ulitsa Vaidavas, 27, kv. 40; Daniel Petrovich Kikust, ulitsa Bikernieku, 81, kv. 34, both of Riga, U.S.S.R.

[22] Filed: June 18, 1974

[21] Appl. No.: 480,533

[52] U.S. Cl. .................. 310/52; 310/113; 310/157; 310/165
[51] Int. Cl.² .......................................... H02K 9/00
[58] Field of Search ......... 310/10, 165, 40, 157, 52, 310/201, 162, 198, 163, 227, 164, 112, 113, 114; 322/28; 321/30

[56] References Cited
UNITED STATES PATENTS

| | | | |
|---|---|---|---|
| 2,102,481 | 12/1937 | Noel | 310/113 |
| 3,015,960 | 1/1962 | Steele | 310/52 |
| 3,242,418 | 3/1966 | Mela | 322/28 |
| 3,368,087 | 2/1968 | Madsen | 310/10 |
| 3,469,121 | 9/1969 | Smith | 310/10 |
| 3,584,246 | 6/1971 | Halas | 310/10 |
| 3,644,766 | 2/1972 | Hughes | 310/40 |
| 3,679,920 | 7/1972 | Mac Nab | 310/52 |
| 3,816,780 | 6/1974 | Smith | 310/52 |

*Primary Examiner*—R. Skudy
*Attorney, Agent, or Firm*—Haseltine, Lake & Waters

[57] ABSTRACT

A cryogen-cooled synchronous compensator, comprising a fixed armature winding and a rotor with a field winding arranged thereon, said windings being made of superconducting materials and located, together with the rotor, within a fixed cryostat, characterized in that the rotor carrying the field winding is enclosed within the cryostat in the airtight housing, adapted to prevent cryogen fluid from contacting the rotary members of the machine.

7 Claims, 3 Drawing Figures

CRYOGEN-COOLED SYNCHRONOUS COMPENSATOR

The present invention relates to the art of generation of electric energy and operation of big electric networks and, more specifically, to cryogen-cooled synchronous compensators.

Cryogen-cooled synchronous compensators may be used as reacting power generator for units adapted to provide for optimum electric network voltage by regulating the voltage and the power factor (cos $\phi$).

The heretofore-known synchronous compensators used for the purpose are rather bulky arrangements featuring great weight and large dimensions. Power losses in said arrangements amount to hundreds and thousands of kilowatts.

Known in the art are electrical machines, wherein the windings are cooled down to ultralow temperatures. Cooling of windings made either of chemically pure metals or of superconducting materials to ultralow temperatures makes for a substantial increase in current density therein without increased losses through the conductor due to zero resistance of superconducting materials to direct current at ultralow temperatures, whereas the resistance of conductors made of pure metals decreases by several orders of magnitude.

The increase in current density in windings and that in intensity of the magnetic field in the air gap of the machine results in an increased per-unit power without enlarging dimensions and impairing the efficiency thereof.

Known in the art is a synchronous generator which comprises a rotor with a field winding and a stator, coaxially and closely embracing said rotor, the field and armature windings being made of a superconducting material. The generator rotor incorporates a shaft rotatably mounted in ball bearings and provided with a plurality of rib-shaped spokes rigidly fixed thereon. Tightly wound on said spokes are coils of the field winding fastened by annular-shaped bandage made of a high-strength low-temperature treated alloy, e.g. Ti-4Al-3Mo-IV. The stator comprises a cylindrical frame provided with inner longitudinal slots for the armature winding. The stator frame rests by the spoke ribs upon the magnetic flux screen embracing the stator, said screen being made of a superconducting sheet material. The screen, rests in turn, by its ribs upon the machine frame with a corresponding cryogen-type thermal insulator embracing said frame. Cooling of both the superconducting field and armature windings as well as maintaining these at temperatures below the critical temperature of the superconducting material of which the above-mentioned windings are made, is preferably effected by supplying gaseous helium at a sufficiently low temperature. The coolant from the helium liquefier is supplied through a pipe passing through the thermal insulator into the space between the frame and the screen. Having passed through the above-mentioned space leftwards (according to the drawing), the coolant then changes the direction of its flow to the right to get, via the perforation made in the screen end face, into the space provided within the screen. Further, the flow of coolant is divided into three concentric branches passing, respectively, through the channels provided in the rotor between the field winding coils and the shaft, through the gap between the rotor and stator, and through the space provided between the outside surface of the rotor frame and the screen. Thereafter, the coolant is again collected to pass as a single flow and, through the pipe which is concentric to that adapted to supply the coolant, is returned to the helium liquefier. Being advantageous to a certain extent, the above-disclosed generator, however, exhibits the followings disadvantages: increased heat inflow to the cold zone; presence of seals where the shaft runs from the generator frame, required to preclude generator coolant leaks, which complicate the design and impair the reliability of generator operation; presence of sliding contacts in the rotor electric circuit, which also impair the reliability of generator operation.

The most serious disadvantage is the increased heat inflow due to both extrinsic and intrinsic origins, which substantially reduces the total efficiency of the generator-helium liquefier assembly.

The principal source of heat inflow of extrinsic origin is the generator shaft which, from considerations of mechanical strength, is expedient to be made as a sufficiently massive member capable of transferring the whole of the generator power to the rotor.

The principal source of intrinsic heat inflow is the friction occurring due to the rotation of the rotor in the coolant.

Another source of intrinsic heat inflow is eddy currents resulting from the variable magnetic field in the metal members of both the rotor and stator. To reduce the effect of the eddy currents, it is expedient that the spoke ribs of both the rotor and the bandage be made as a stack of thin and isolated metal sheets. Such an approach substantially reduces the release of heat due to eddy currents, but fails to completely eliminate this source of heat.

It is a primary object of the present invention to provide a cryogen-cooled synchronous compensator featuring all the above-mentioned advantages of the disclosed cryogen-cooled synchronous generator and free of the disadvantages inherent in the design of the latter. It is also taken into consideration that the synchronous compensator would operate as a reacting power generator, i.e. without any load on the shaft. More particularly, the objects of the invention will be as follows.

A specific object of the present invention is to minimize the outer heat inflow to the machine members.

Another object of the invention is to minimize the inner heat release due to friction resulting from the rotation of the machine members in the coolant.

Still another object of the invention is to provide a synchronous compensator wherein the effect from the heat release due to eddy currents is reduced to a minimum.

An additional object of the invention is to provide a synchronous compensator devoid of relatively complicated and unreliable shaft seal assemblies in the machine frame.

Yet another object of the invention is to provide a cryogen-cooled synchronous compensator devoid of sliding contacts in the electric circuitry.

A more general object of the invention is to provide a highly efficient, reliable and simple cryogen-cooled synchronous compensator.

These objects are accomplished by that in a synchronous compoensator, comprising a fixed armature winding and a rotor with a field winding accommodated therein, said windings being made of a superconducting material and enclosed in a fixed cryostat, according to the invention, the rotor along with a field winding, whose shaft carries a starting motor and a field generator, both fitted thereon, is enclosed in the cryostat in a fixed airtight housing adapted to prevent the cryogen fluid from contacting the rotabale members of the machine.

It is advisable that the armature winding made as separate coil groups be arranged directly on the outer surface of said airtight housing serving as a frame for the armature winding.

It is expedient that the rotor shaft be mounted in the bearings inside the airtight housing, the entire assembly being fixed vertically in position in the cryostat.

It is advantageous that the field winding be supplied with direct current from the rotor of the field generator via superconductors.

It is also advantageous that the inner space of the airtight housing be filled with gaseous helium, while the outer walls of the housing be in contact with liquid nitrogen.

Other objects and advantages of the present invention will be more apparent from the following detailed description of a specific embodiment thereof with reference to the accompanying drawings, wherein.

A cryogen-cooled synchronous compensator is essentially an overexcitation equipolar machine capable of operating as a motor without any load on the shaft and serving to generate the reacting power in electrical networks.

Figure 1:
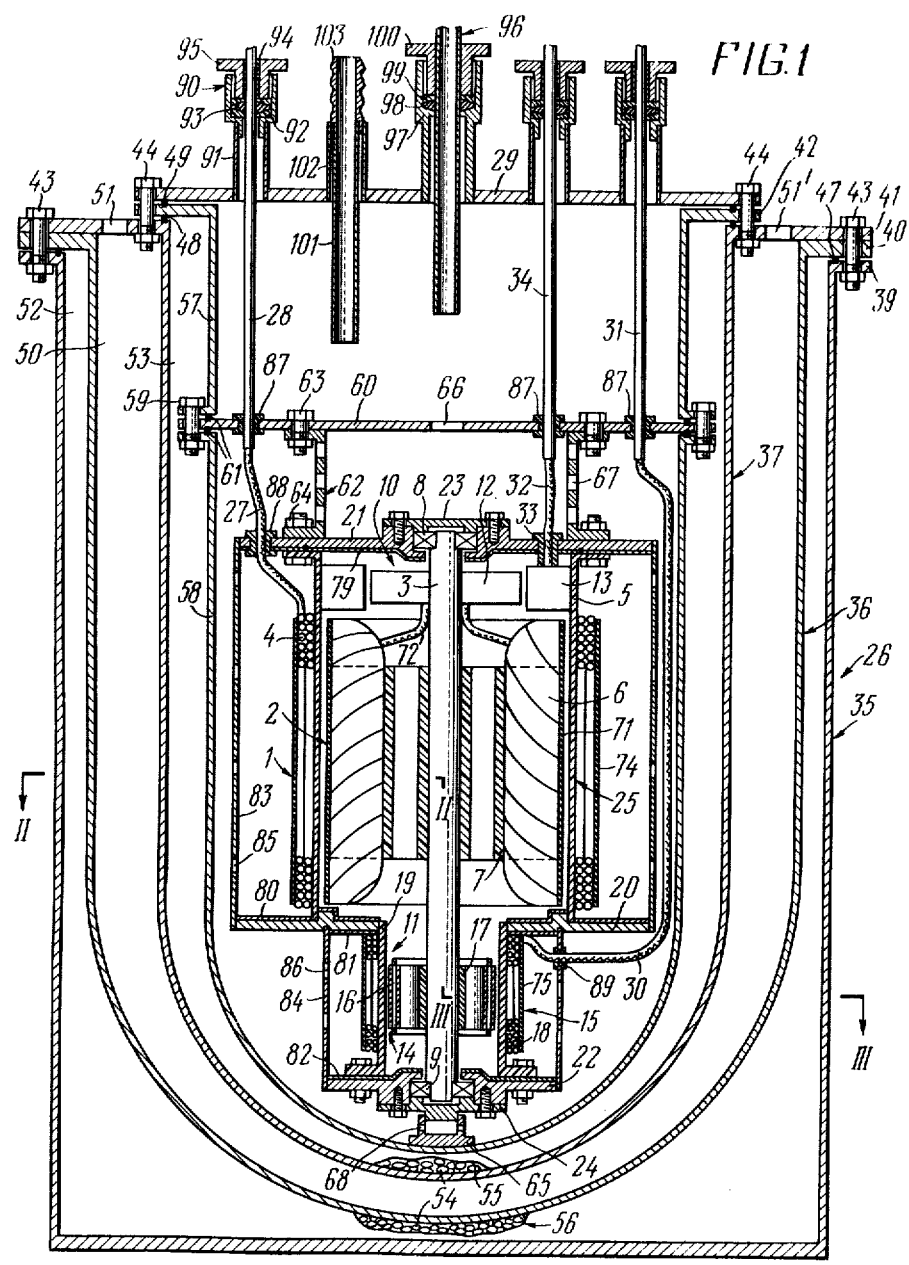
FIG. 1 is a longitudinal section view of a cryogen-cooled synchronous compensator, according to the invention.

Referring to FIG. 1, the synchronous compensator of the present invention comprises a stator 1 and a rotor 2 rotatably mounted on a shaft 3. The stator 1 comprises an armature winding 4 arranged on the outer surface of a cylindrical frame 5 which coaxially and closely embraces the rotor 2. The rotor 2 comprises a field winding 6 arranged on a cylindrical frame 7 which is rigidly fitted on the shaft 3 and adapted to rotate only therewith. The shaft 3 is mounted in bearings 8 and 9. Mounted on the shaft 3 together with the rotor 2 are field generator 10 and a starting motor 11. A rotor 12 of the field generator 10 is fitted on the shaft 3 between the bearing 8 and the rotor 2 of the synchronous compensator. A stator 13 of the field generator 10 is so fastened inside the cylindrical frame 5 of the compensator that the stator 13 coaxially and closely embraces the rotor 12. Used as the field generator 10 is a conventional superconducting topological generator, therefore the design of said generator is not considered in detail.

The starting motor 11 comprises a rotor 14 and a stator 15. The rotor 14 of the starting motor 11 is fitted on the shaft 3 between the bearing 9 and the rotor 2 of the synchronous compensator. The rotor 14 comprises a squirrel-cage winding 16 arranged on a cylindrical frame 17. The stator 15 of the starting motor 11 comprises an armature winding 18 arranged on the outer surface of a cylindrical frame 19 which closely embraces the rotor 14.

The end face of the frame 19 of the stator 15 of the starting motor 11 and that of the frame 5 of the stator 1 of the synchronous compensator, which face each other, are rigidly secured in a disk 20. Bolted on the opposite end face of the frame 5 of the stator 1 of the synchronous compensator is a bearing end shield 21, while a shield 22 is bolted on the opposite end face of the frame 19. From outside, the bearing 8 is enclosed by a bearing cover 23 and the bearing 9 is enclosed by a bearing cover 24. All joints, viz. between the cover 23 of the bearing 8 and the bearing end shield 23, between the bearing end shield 21 and the frame 5, between the frame 5 and the disk 20, between the disk 20 and the frame 19, between the frame 19 and the bearing end shield 22, as well as between the bearing end shield 22 and the cover 23 of the bearing 9, are made airtight. Thus, the interconnected disk 20, frames 5 and 19, bearing end shields 21 and 22, and covers 23 and 24 of the bearings 8 and 9 make up an airtight housing 25, accommodated in which are the shaft 3, rotatably mounted in the bearings 8 and 9 and bearing the rotor 1 of the synchronous compensator, the rotor 12 of the field generator 10, the rotor 14 of the starting motor 11, and the rotor 13 of the field generator 10. The above-mentioned assembly is fixed vertically in position in a cryostat 26.

Electric leadouts are provided for the stator winding only. Leadouts 27 of the compensator armature winding are soldered to copper tubes 28 which are brought through a cover 29 of the cryostat 26. In the three-phase armature winding 4 of the compensator is of a conventional design, provision is made for three identical leadouts from the armature winding 4 of the compensator. Leadouts 30 of the armature winding 18 of the starting motor 11 are soldered to copper tubes 31 which are also brought out through the cover 29 of the cryostat 26. If the armature winding 13 of the starting motor 11 is normally fed with three-phase current, provision is made for three identical leadouts from the armature winding 18 of the starting motor 11. Leadouts 32 of the stator winding of the field generator 10 are made so as to maintain airtightness of the housing 25. To this end, the leadouts 32 pass through an opening made in insulating tubes 33 which are hermetically fitted in the bearing end shield 21 and filled with epoxy resin. The leadouts 32 are also soldered to copper tubes 34 which are brought out through the cover 29 of the cryostat 26. The number of identical leadouts of the stator windings of the field generator 10 depends on the design of the topological field generator 10.

The cryostat 26 is essentially a double Dewar vacuum flask provided with an intermediate heat barrier for which purpose, in the herein-considered embodiment, liquid nitrogen is used. The cryostat 26 is made up of four vessels coaxially fitted one into another. An outer vessel 35 of the cryostat 26 features cylindrical walls and a flat bottom. Vessels 36, 37 and 38 successively fitted into the outer vessel 35 of the cryostat 26 feature cylindrical walls and hemispherical bottoms. Said vessels 36, 37 and 38 are shaped as described above to ensure the required mechanical strength. With a view to minimizing heat inflow into the cryostat 26 through the walls of the vessels 36, 37 and 38 due to heat conductivity, said vessels should preferably be made of thin-sheet low-conduction materials, preferably of stainless steel. The outer vessel 35 of the cryostat 26 may be made of any vacuum-proof structural material, e.g. steel, copper, brass and the like. The wall thickness of said vessel is only determined by the required mechanical strength. The walls of the vessels 35, 36, 37 and 38 terminate in flanges 39, 40, 41 and 42. Respectively, the vessels 35, 36, 37 and 38 are interconnected by bolts 43 and 44 so as to provide ensure contact between the flanges 39, 40 and 41, 42 of the vessels 35, 36 and 37, 38 only, with no contact between the walls thereof. Also held to the inside vessel 38 of the cryostat 26 by bolts 44 is the cover 29 of the cryostat 26. The airtightness of joints between the vessels 35 and 36, 37 and 38, as well as between the inside vessel 38 of the cryostat 26 and the cover 29 is ensured by gaskets 47, 48 and 49 made of vacuum rubber and fitted into the annular grooves made in the flanged 39, 41 and 42.

A space 50 provided between the vessels 36 and 37 of the cryostat 26 is filled with liquid nitrogen through an opening 51 made in the flange 41. Another identical opening 51 is adapted to vent out the evaporating nitrogen. A space 52 provided between the vessels 35 and 36 and a space 53 between the vessels 37 and 38 of the cryostat 26 are vacuum tight.

For higher vacuum, use is made of activated birch charcoal 54 serving as an adsorption pump. To accommodate said charcoal, pockets 55 and 56 made of fine copper gauze are provided which are soldered to the inner surface of the bottom of the vessel 37 and to the outer surface of the bottom of the vessel 36. The use of activated coal permits of evacuating the spaces 52 and 53 only to $10^{-1}$ to $10^{-2}$ mm Hg. After liquid nitrogen has been filled into the space 50 between the vessels 36 and 37 of the cryostat 26, the activated coal is cooled and vacuum is increased up to $10^{-6}$ to $10^{-8}$ mm Hg. The liquid nitrogen in the space 50 serves as a heat barrier capable of preventing heat inflow to the inner vessel 38 through the walls of the cryostat 26.

The inside vessel 38 of the cryostat 26 is composed of two portions 57 and 58. Held by bolts 59 at the joint between said portions is a disk 60 adapted to fix in position the main assembly of the compensator within the cryostat 26. The airtightness between the portions 57 and 58 of the inner vessel 38 of the cryostat 26 and thd disk 60 is provided by gaskets 61 placed in the annular-shaped grooves made in the disk 60. Fastening of the main assembly of the compensator inside the cryostat is provided by a bush 62 which is held by bolts 63 to the disk 60 and by bolts 64 to the bearing end shield 21. From below, said assembly is fixed in position by a structural member 65 which is welded to the bottom of the lower portion 57 of the inner vessel 38 of the cryostat 26.

The inner vessel 38 of the cryostat 26 is filled with liquid helium through the cover 29. For this purpose, the disk 60 is provided with an opening 66. When the compensator operates, the level of liquid helium is maintained at the level midway of the disk 60 and the bearing end shield 21. To ensure circulation of helium both through the bush 62 in the structural member 65, provision is made of openings 67 and 68. Respectively, the disk 60 is used, besides performing the function of a fastening assembly, as a heat barrier. For this purpose, the disk 60 is made of a material featuring adequate heat conductivity, preferably of copper. No liquid helium is fed inside the airtight housing 25. The space inside the housing 25 is filled with gaseous helium at a pressure of $10^{-1}$ to $10^{-2}$ mm Hg. The members arranged within said housing 25 are cooled from the outside through the walls of the housing 25 due to heat conductivity through the walls thereof and due to convection of gaseous helium inside the housing 25. It is expedient for such cooling that heat release within the airtight housing 25 be minimum. This fact is taken into account in the design of the assemblies accommodated within the housing 25. All the compensator windings are of superconducting wire made of Nb-Zr; Nb-Ti. $Nb_3Zn$; $Nb_3Ga$ and other alloys.

Figure 2:
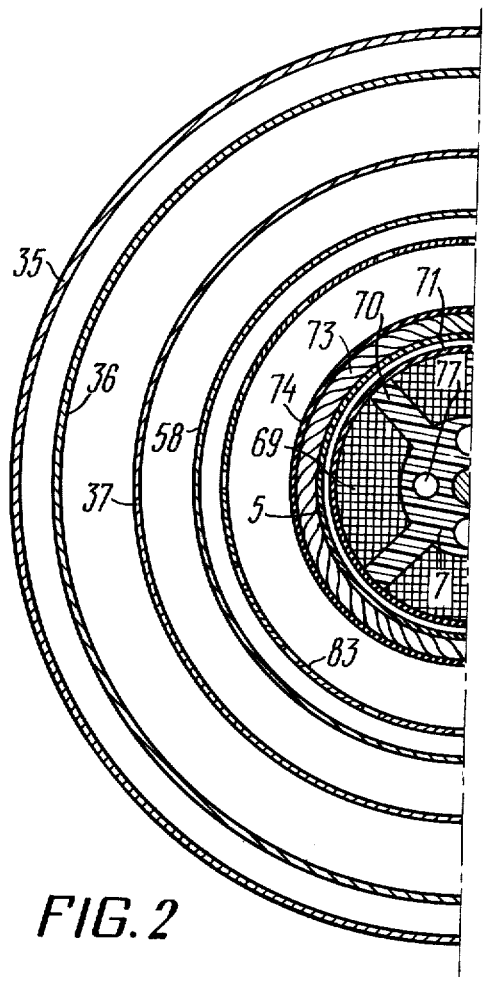
FIG. 2 is a section taken along line II—II of FIG. 1.
Figure 3:
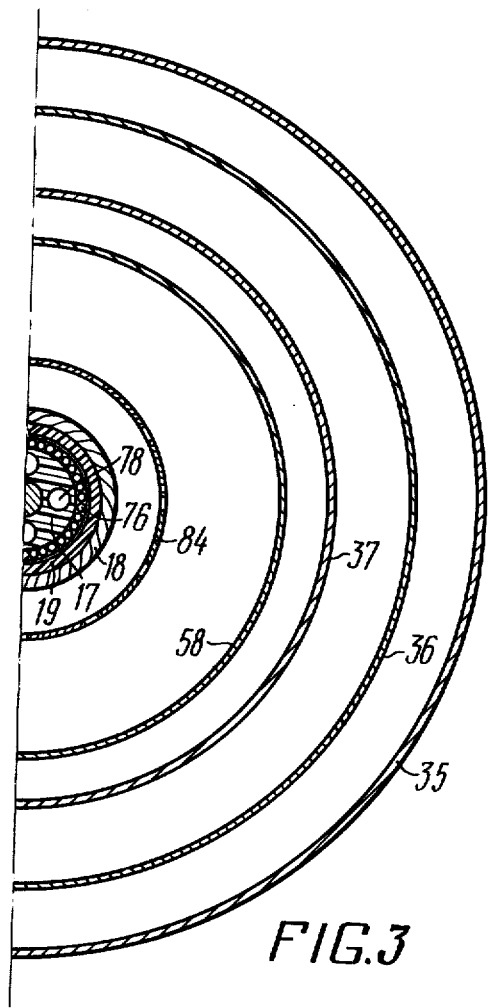
FIG. 3 is a section taken along line III—III of FIG. 1.

The wires made of said materials are known to have no losses due to direct current. The field winding 6 is essentially an even number of coils 69 arranged symmetrically along the circle of the frame 7 of the rotor 2 of the compensator. The frame 7 (FIG. 2) is provided with spoke-shaped ribs 70 on which the tightly wound coils 69 of the field winding 6 are fitted. The coils 69 are fixed in position by a bandage 71 and, should the need arise to add to their rigidity, they may be filled with an appropriate compound. In a specific embodiment of the generator, use is made of four coils 69 of the field winding 6. Direct current from the rotor 12 (FIG. 1) of the field generator 10 is supplied to the field coils 69 through a superconductor 72. The armature winding 4 of the compensator is made of a superconducting wire, featuring minimum losses due to direct current. Such wires are made at present as cables comprising a great number of very thin cores made of identical alloys used for manufacture of d.c. superconductors. The armature winding 4 consists of flat coils 73 (FIG. 2) which are symmetrically arranged along the outer surface of the cylindrical frame 5 of the rotor 1 of the compensator and interconnected in a conventional three-phase circuit normally used to connect the armature windings of electrical machines. The armature winding 4 is fixed in position on the frame 5 of the stator 1 by a bandage 74 and should the need arise to add to its rigidity it may likewise be filled with an appropriate compound. When the compensator operates, a certain amount of heat may be released due to d.c. losses in the armature winding 4 (FIG. 1), therefore the latter is arranged beyond the airtight housing 25 and is directly filled with liquid helium. The armature winding 18 of the starting motor 11 is also made of a superconducting wire adapted to operate on direct current and is identical in design to the armature winding 4 of the compensator. With a view to minimizing heat release inside the airtight housing 25 when the compensator is started, the armature winding 18 of the starting motor 11 is also arranged on the outer surface of the cylindrical frame 19 of the stator 15 and is fixed in position by a bandage 75. The winding 16 of the rotor 14 of the starting motor 11 is made of a superconducting wire and resembles a squirrel-cage rotor winding of induction machines. The winding 16 is made up of straight conductors 76 (FIG. 2) which are arranged in openings provided in the frame 17 (FIG. 1) of the rotor 14 of the starting motor 11 and are interconnected on the end faces of said frame 17.

When the compensator operates under steady-state conditions, electric current only flows through the field winding 6 and through the armature winding 4 of the compensator.

In this case, direct current flows through the field winding 3 and, the latter being superconducting, the heat due to losses is not released. The heat in the field winding 6 and in the windings of the rotor 13 and the rotor 12 of the field generator 10 can be released only when the operating conditions of the compensator change. When the compensator is started, the heat can be released also in the squirrel-cage winding 16 of the rotor 14 of the starting motor 11. Therefore, starting of the compensator and changing the operating conditions thereof must be effected during a sufficiently long period so that the heat released in the windings be transferred from the airtight housing 25 into the liquid helium cooling said housing. The pressure of helium inside the housing 25 is selected to provide for adequate heat transfer due to gas convection, while the amount of heat released as a result of friction of rotary members into the helium filling the housing 25 is yet insignificant. To enhance helium convection inside the housing 25, use is made of openings 77 (FIG. 2) made in the frame 7 of the rotor 2 of the compensator and of openings 78 made in the frame 17 of the rotor 14 of the starting motor 11.

Another source of heat within the airtight housing 25 may be associated with the eddy currents developing in metal members of the machine when said members are permeated with a magnetic flux. With a view to precluding the appearance eddy currents, the frame 7 of the rotor 2, the frame 5 of the stator 1 of the compensator, the frame 16 of the rotor 14 and the frame 19 of the stator 15 of the starting motor 11 are made of an insulating material, preferably of glass-fibre laminate. The bandages 71, 74 and 75 of the windings are made of a fibreglass band. The bearing end shields 21 and 22 and the disk 20 are protected against the magnetic flux by the superconducting screens 79, 80, 81 and 82 which are essentially a thin layer of a superconducting material (niobium, lead, and the like) directly applied to the inner surfaces of said members. The walls of the inner vessel 38 of the cryostat 26 are protected against the magnetic flux by the cylindrical screens 83 and 84 made of a superconducting sheet material. The screen 83 encompasses the compensator armature winding and is fixed in position between the disk 20 and the bearing end shield 21. The screen 84 encompasses the armature winding 18 of the starting motor 11 and is fixed in position between the disk 20 and the bearing end shield 22. To admit liquid helium into the inner space of the screens 82 and 84, the screen 83 is provided with openings 85, while the screen 84 is provided with openings 86.

Still another source of heat within the airtight housing 25 is associated with the bearings 8 and 9. For a better removal of heat from the bearings 8 and 9 they are fitted in sturdy metal end shields 21 and 22 which are in contact with liquid helium and contribute greatly to removal of heat from the bearings due to heat conductivity thereof. If necessary, use may be made of superconducting electromagnetic bearings featuring no friction losses.

To fasten the copper tubes 28, 31 and 34 of the electric leadouts of the compensator windings use is made of insulating bushes 87 through which said tubes 28, 31 and 34 are passed and which are fixed in position on the disk 60. An insulator 88 is secured in the bearing end shield 21 where the leadout of the armature winding 4 of the compensator passes through said end shield 21, and an insulator 89 is provided in the superconducting screen 84 where the leadout of the armature winding 18 of the starting motor 11 passes through said superconducting screen 84.

The copper tubes 23, 31 and 34 are fastened in the cover 29 of the cryostat 26 by identical fastening assemblies made up of a bushing 90, which is secured to the cover 29 of the cryostat 26 by means of a thin-walled tube 91 made of stainless steel, and a washer 92, a gasket 93 made of vacuum rubber, a tube 94 provided with a shoulder and a nut 95, all these being accommodated in said bushing 90. The washer 92 and the tube 94 are made of an insulating material (textolite, vinyl plastic, and the like). The tube 94 is fitted on the copper tube 28 of the leadout and is adapted to insulate the copper tube 28 from the nut 95. The nut 95 rests by its lower end, on the shoulder of the tube 94. When the nut 95 is tightened, the shoulder of the tube 94 compresses the gasket 93 and fixes the copper tube 28 in position.

To fill the cryostat with liquid helium use is made of a helium filler neck 96 which is fitted into the fastening assembly made up of a bushing 97 welded to the centre of the cover 29, the bushing accommodating a gasket 98 made of vacuum rubber, a pressure ring 99 and a nut 100. When the nut 100 is tightened, the gasket 98 is compressed to fix the helium filler neck 96 in position. Such a constructional arrangement of the fastening assemblies of the helium filler neck 96 and the copper tubes 28, 31 and 34 of the leadouts, ensures airtightness of the inner vessel 38 of the cryostat. To remove helium vapours, use is made of a vent tube 101 which is fixed in position in the cover 29 by means of a tube 102 made of stainless steel, whereon a nozzle outlet 103 is fitted.

The thin-walled tubes 91 and 101 are used to reduce heat inflow from the cryostat cover due to heat conductivity.

To provide for continuous operation of the compensator, it should preferably be included in a continuous cycle along with the helium liquefier, with both the liquid helium filler neck 96 and the vent tube 101 being connected to the helium liquefier.

As can be inferred from the detailed description of the above embodiment of the herein-proposed synchronous compensator, the objects of the invention have been attained in a highly efficient, reliable and simple cryogen-cooled synchronous compensator.

The only thing that is brought out of the cryostat are the leadouts of the stator windings. The compensator shaft remains completely housed within the cryostat. This feature substantially reduces the total section area of the metal "heat bridge" adapted to connect the low-temperature zone of the compensator with the surrounding space, thereby sharply reducing the outer heat inflow due to heat conductivity of the metal members projecting from the cryostat. All the rotary members of the compensator are enclosed in the airtight housing, thus completelx eliminating their contact with the coolant (liquid helium). The pressure of the gaseous helium inside the airtight housing is selected sufficiently low to minimize heat release due to friction resulting from the rotation of the machine members in said helium. This fact eliminates the most important source of inner heat release, viz., friction resulting from the rotation of the machine rotor in the coolant.

All the structural members of the compensator permeated by the magnetic flux, with the exception of the windings, are made of an insulating material. All the metal members confining the area wherein the variable magnetic flux propagates are screened to prevent the magnetic flux from permeating said members by screens made of a superconducting sheet material. The compensator windings are made up of a multicore superconducting cable with very thin cores. All this almost completely eliminates the release of heat due to eddy currents appearing in metal members.

Since the shaft of the synchronous compensator is completely enclosed in the airtight housing, no seal assemblies for the shaft are required in the machine frame.

The use of a special field generator whose rotor is fitted on the common shaft with the compensator rotor to supply power to the field winding has made it possible to provide a synchronous compensator with no sliding contacts in the electrical circuits of the rotor.

It should be noted that the airtight housing accommodating the rotary members of the compensator cannot be considered as a separate cryostat for the machine rotor. As is known, a cryostat serves to provide for thermal insulation of the internal space thereof from the surrounding space. The airtight housing here performs the opposite function: it serves as a mechanical barrier preventing the cryogen fluid from contacting the rotary members of the machine ensuring at the same time, due to heat conductivity of the walls thereof, cooling of the members enclosed in said housing to the ambient temperature, i.e., to the temperature of the liquid helium. The cooling system of the proposed synchronous compensator proves to be more effective compared with that used in the conventional construction described herein-above. Because of low specific liquid helium evaporation heat and a relatively high heat release due to friction resulting from rotation of the machine rotor in liquid helium, the heretofore-known synchronous generator with superconducting windings at a sufficiently high speed of rotation of the rotor fails to ensure cooling of the windings to the temperature of liquid helium at normal pressure, i.e., to 4.2°K. It is also known that critical parameters (critical current density and field intensity) of superconducting materials tend to decrease with increasing temperature. Therefore, when superconducting windings of a synchronous generator are cooled by gaseous helium having an ultra-low temperature, the efficiency of the windings made of superconducting materials is impaired.

In the herein-proposed synchronous compensator, the armature winding is arranged on the outer surface of the airtight housing and is completely submerged in an adequate amount of liquid helium, therefore, when the compensator operates, said armature winding has a temperature approximating 4.2°K. The airtight housing with the rotary members of the machine enclosed therein is completely submerged in liquid helium and the walls of the airtight housing have a temperature of 4.2°K. As a result, heat release within the airtight housing is minimum and the heat transfer between the members enclosed in said housing and the walls thereof is quite sufficient due to convection of gaseous helium filling the airtight housing at a low pressure, therefore the temperature of the field winding of the compensator enclosed within the airtight housing is also maintained close to 4.2°K. Thus, the herein-proposed synchronous compensator enables maintaining a lower and more stable temperature of the superconducting windings compared with the known synchronous generator, wherein the windings of the stator and rotor are made of a superconducting material. As a result, the stability of the parameters of the superconducting windings, as well as the efficiency of utilization thereof may be increased.

The cooling system of the herein-proposed compensator is also advantageous in that a helium liquefier of low efficiency is required. When the compensator cryostat is filled with liquid helium up to the required level, it is only necessary to supply liquid helium through the pipes running from the helium liquefier in an amount required to compensate for evaporation of helium in the cryostat, thereby dispensing with continuous powerful flow of the coolant through the machine.

The essence of the present invention resides in that:
the rotor of the synchronous compensator carrying the field winding within the cryostat, is enclosed within a fixed airtight housing, adapted to prevent the cryogen fluid from contacting the rotary members of the machine;

the armature winding of the compensator and the armature winding of the starting motor made as a plurality of coil groups, are arranged directly on the outer surface of said airtight housing, serving as a frame for said armature windings;

enclosed in the airtight housing is the rotor shaft rotatably mounted in bearings, having the compensator rotor with the field winding, the starting motor rotor with the squirrel-cage winding and the excitation generator rotor mounted on the same shaft;

the field winding is energized by direct current from the field generator through the superconductor;

the internal space of the airtight housing is filled with gaseous helium;

all the members of the synchronous compensator permeated by a closed magnetic flux are made of an insulating material and all the metal members which confine the area, wherein the variable magnetic flux propagates, are protected against the magnetic flux in said members by screens made of a superconducting sheet material.

Though this invention has been described with reference to a prefered embodiment of a synchronous compensator, it will be understood that minor changes in the construction thereof may be made without departing from the spirit and scope of the invention and the present embodiment should be considered as an illustrative one, by no means restricting the field of application of the present invention.

What is claimed is:

1. A cryogen-cooled synchronous compensator, comprising: a fixed cryostat;
   an armature winding made of a material exhibiting superconductivity at sufficiently low temperatures;
   a rotary assembly including a rotor with a starting motor and a field generator mounted on a shaft of the rotor;
   a field winding arranged on said rotor and made of a material exhibiting superconductivity at predetermined low temperatures;
   said armature winding and said rotary assembly being accommodated within said fixed cryostat;
   an airtight housing accommodated within said cryostat;
   said rotary assembly being enclosed in said cryostat in said fixed airtight housing adapted to prevent the cryogen fluid from contacting the rotary members of the machine;
   said rotary assembly being rotatably mounted in said airtight housing.

2. A synchronous compensator as claimed in claim 1, wherein said armature winding is made as a plurality of electrically interconnected coil groups, and arranged directly on the outer surface of said airtight housing serving as a frame for said armature winding.

3. A synchronous compensator as claimed in claim 1, wherein said airtight housing comprises bearings whose inner races mount the shaft of said rotor, while the outer races of said bearings are fixed in position within said housing.

4. A synchronous compensator as claimed in claim 1, wherein said rotary assembly is mounted vertically in said cryostat.

5. A synchronous compensator as claimed in claim 1, wherein power supply of said field winding is effected by direct current through conductors made of a superconducting material, from the rotor of the field generator.

6. A synchronous compensator as claimed in claim 1, wherein the internal space of said airtight housing is filled with gaseous helium, while the space between said housing and the cryostat is in contact with liquid helium.

7. A synchronous compensator as claimed in claim 1, comprising magnetic screens, located in the space between said housing and the inner surface of said cryostat, coaxially embracing said armature winding and said rotor assembly, said screens being made of a superconducting sheet material and provided with openings for gaseous helium to pass therethrough.

* * * * *